United States Patent
Hamidzadeh et al.

(10) Patent No.: US 6,418,350 B1
(45) Date of Patent: Jul. 9, 2002

(54) PERIODIC SCHEDULER FOR DUAL-ARM ROBOTS IN CLUSTER TOOLS WITH PROCESS-MODULE RESIDENCY CONSTRAINTS

(75) Inventors: Babak Hamidzadeh; Shadi Rostami-Hesarsorkh, both of Vancouver; Daniel Camporese, New Westminster, all of (CA)

(73) Assignee: Brooks Automation Inc., Chelmsford, MA (US)

( * ) Notice: Subject to any disclaimer, the term of this patent is extended or adjusted under 35 U.S.C. 154(b) by 0 days.

(21) Appl. No.: 09/592,471

(22) Filed: Jun. 9, 2000

(51) Int. Cl.[7] ............................................. G06F 19/00
(52) U.S. Cl. ...................................................... 700/100
(58) Field of Search ............................... 700/121, 100, 700/99, 102, 103, 112

(56) References Cited

U.S. PATENT DOCUMENTS

| | | | |
|---|---|---|---|
| 5,375,061 A | * 12/1994 | Hara et al. ................... 700/101 |
| 5,801,945 A | 9/1998 | Comer ........................ 700/100 |
| 5,975,740 A | * 11/1999 | Lin et al. ..................... 700/99 |
| 6,049,742 A | * 4/2000 | Milne et al. ................. 700/99 |
| 6,122,621 A | * 9/2000 | Shimada ...................... 705/8 |
| 6,201,999 B1 | * 3/2001 | Jevtic ......................... 700/100 |

* cited by examiner

*Primary Examiner*—Thomas Black
*Assistant Examiner*—Edward F. Gain, Jr.
(74) *Attorney, Agent, or Firm*—Perman & Green, LLP

(57) ABSTRACT

A method for scheduling the allocation of resources in a semiconductor object processing tool. The method comprises identifying a conflict in a resource allocation schedule for the processing of a plurality of semiconductor objects through the tool over time. The schedule utilizes a fundamental period for scheduling the periodic introduction of the objects into the tool for processing. A conflict arising when a transport mechanism adapted to move the objects to and from the resources in the tool is scheduled to execute more than one transport action in a given time interval. The time blocks associated with the conflict are rescheduled from a present time interval to a different time interval such that the rescheduling of the time block does not violate a post-processing residency constraint for a residency time that the object spends in the resource whose time block is rescheduled.

17 Claims, 17 Drawing Sheets

PERIODIC SCHEDULER FOR DUAL-ARM ROBOTS IN CLUSTER TOOLS WITH PROCESS-MODULE RESIDENCY CONSTRAINTS

BACKGROUND OF THE INVENTION

1. Field of the Invention

The present invention relates to semiconductor processsing tools and, more particularly, to a method and apparatus for scheduling the movement of a semiconductor object through a processing tool.

2. Prior Art

Scheduling a semiconductor object processing tool, such as a cluster tool, involves specifying a sequence of transport mechanism actions and their times, as applied to the objects, and moving the objects between processing modules while satisfying timing and throughput requirements. Due to stringent timing and throughput requirements, the scheduling problem in these tools can be quite complex.

U.S. Pat. No. 5,801,945 discloses a scheduling method for a robotic manufacturing process. The method includes adjusting a timetable so that the last operation to occur to an object is planned to occur as soon as possible and the first operation for the object is planned to occur as late as possible.

SUMMARY OF THE INVENTION

The present invention is directed to, in a first aspect, a method for scheduling the allocation of resources in a semiconductor processing tool. The method generally comprises identifying a conflict in a resource allocation schedule for the processing of semiconductor objects through the tool over time. Preferably, the schedule utilizes a fundamental period for scheduling the periodic introduction of the objects into the tool for processing. Conflicts occur when a transport mechanism adapted to move the objects to and from the resources in the tool is scheduled to execute more than one transport action in a given time interval. Time blocks in the schedule for the resources are rescheduled from a present time interval to a different time interval. Preferably, the rescheduling of a time block does not violate a post-processing residency constraint for a residency time that the object spends in the resource whose time block is rescheduled.

In another aspect, the present invention is directed to a method for resolving a conflict in an object processing tool resource allocation schedule. The total time of the initial schedule is increased, without changing the fundamental period of the schedule until all conflicts in the schedule are resolved. The total time of the initial schedule is increased by moving a transport action associated with the conflict to start at an earlier time slot to form a target schedule. The moving of the transport action does not violate a post-processing residency constraint for a residency time that the object spends in the resource whose transport action is moved. The total time is increased until all conflicts are resolved or until a bound on increasing the total time of the schedule is reached.

In yet another aspect, the present invention is directed to a computer program product. The computer program product comprises a computer useable medium having computer readable program code means embodied therein for causing a computer to resolve a conflict in a schedule for a semiconductor object processing tool. The computer readable program code means in the computer program product comprises computer readable program code means for causing a computer to reschedule at least one time block in the schedule from a present time interval to a different time interval. The rescheduling of the time block does not violate a post-processing residency constraint for a residency time that the object spends in the resource whose time block is rescheduled.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
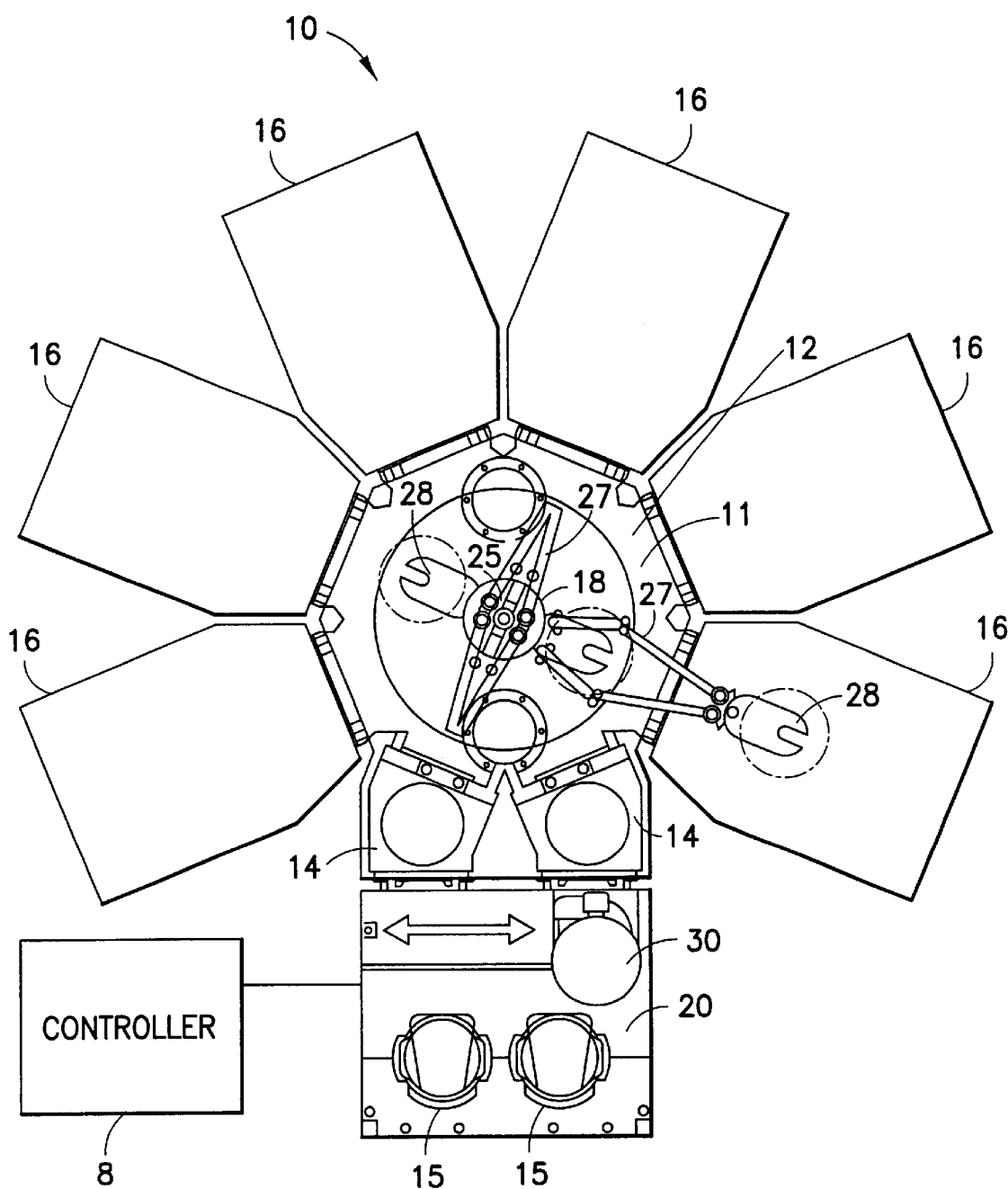
FIG. 1 is a top plan view of an object processing apparatus incorporating features of the present invention.

Referring to FIG. 1, there is shown a schematic top plan view of a semiconductor object processing apparatus 10 incorporating features of the present invention. Although the present invention will be described with reference to the single embodiment shown in the drawings, it should be understood that the present invention can be embodied in many alternate forms of embodiments. In addition, any suitable size, shape or type of elements or materials could be used.

The apparatus 10, also described herein as a tool, generally comprises a main section 12, load lock module 14, transfer cassette 15, processing modules 16, a transfer mechanism 18 and a transfer section 20. The apparatus 10 may also include a controller 8. In the preferred embodiment, the apparatus 10 is a cluster tool adapted to process semiconductor substrates or objects 30. However, in an alternate embodiment, the apparatus could include any material processing apparatus, including other than a cluster tool. The chamber 11 formed by the main section 12 is preferably maintained in a vacuum. In an alternate embodiment, chamber 11 may be maintained in any suitable environment, such as for example, an inert gas.

The load lock modules 14 and processing modules 16 are well known in the art. In the preferred embodiment, the apparatus 10 can include more that one load lock 14 and processing module 16. Transfer section 20 may also include one or more removable cassettes 15 that are adapted to hold one or more semiconductor objects 30. In one embodiment, the load locks 14 are indexing load locks with substrate support shelves that move up and down. In an alternate embodiment, the load lock module 14 could be any suitable type of substrate supply module. In the preferred embodiment, the object 30 could be semiconductor wafers or flat panel display substrates.

However, in an alternate embodiment, the object 30 could comprise any other suitable type of semiconductor material or substrate for processing through a processing apparatus 10.

The transport mechanism 18 generally comprises a robot arm transport mechanism and is provided for moving the objects 30 among the modules 14, 16. Preferably, the transport mechanism 18 comprises a drive section 25, a movable arm section 27 and an object holder 28. The holder 28 is adapted to move through doorways 21 into and out of the modules 14, 16 in order to transfer the objects to and from the modules 14, 16. In the preferred embodiment, the transport mechanism is a dual arm transport mechanism with two holders 28, pointing in opposite directions, each capable of carrying an object 30. Preferably, the two holders 28 are tightly coupled by construction, such that at any one time, only one of the two holders 28 can transfer an object to or from a module 14, 16. However, in an alternate embodiment, any suitable transport mechanism can be used, other than including a dual arm robot. It is a unique feature of the present invention that one of the holders 28 of the dual arm transport mechanism 18 can be used as a temporary buffer to hold one object 30 while another is be acted on. In the embodiment shown in FIG. 1, the object holder 28 is adapted to individually move only one object 30 at a time. However, in alternate embodiments, the holder 28 could be sized and shaped to move multiple objects at the same time.

The transfer section 20 includes means for holding cassettes 15 of objects 30, and a robot for moving the objects 30 in the cassette 15 into and out of the load locks 14. In alternate embodiments, any suitable object loading system, manual and/or automatic computer controlled, could be used for loading objects 30 into the load lock 14.

Figure 13:
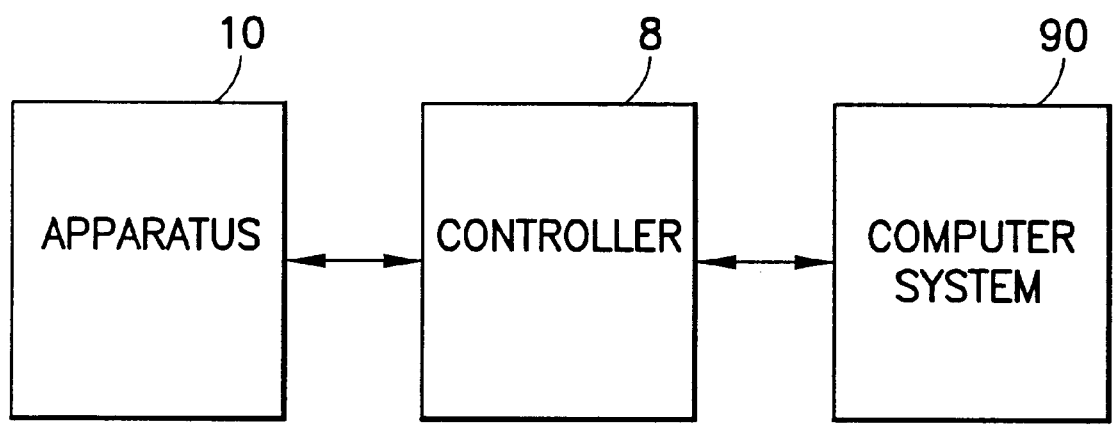
FIG. 13 is a block diagram of one embodiment of an apparatus that may be used to practice the present invention.

The controller 8 is preferably a computer controller. The controller 8 is operably connected to the main section 12, load lock modules 14, processing modules 16, transfer mechanism 18 and transfer section 20 to control their functions. The movements of an object through the apparatus 10 and the functions of the apparatus 10 are typically under the control of "scheduling" software. The controller 8 is preferably adapted to control the movement of an objects 30 through the apparatus 10, as well as the functionality of the various components of the apparatus 10. FIG. 13 is a schematic representation of a typical apparatus that may be used to practice the present invention. Computer system 90 may be linked to controller 8 such that information can be sent to and from the computer 90 and controller 8. Computer 90 is capable of utilizing program storage devices embodying machine readable source code which causes the computer to perform the method steps of the present invention. The program storage devices of the present invention may be devised, made and used as a component of a machine utilizing optics, magnetic properties and/or electronics to perform the method steps of the present invention. Program storage devices include, but are not limited to, magnetic diskettes, magnetic tapes, optical disks, read only memory, floppy disks, semiconductor chips and the like. Computer 90 may include a microprocessor for executing stored programs and can include a data storage device on its program storage device for the storage of information and data. The computer program or software incorporating the method steps and instructions described may be stored in the computer 90 or on an otherwise conventional program storage device.

Generally, the operation of the apparatus 10 comprises an object 30 entering the apparatus 10 through the load lock 14. Preferably, the apparatus comprises two load locks 14 so that while objects 30 from one cassette 15 are being processed, another cassette 15 with additional objects 30 is being loaded into the apparatus 10 for subsequent processing. The load lock 14 and cassette module 15 interface with the environment external to the apparatus 10. The transport mechanism 18 moves the objects 30 from one module 14, 16 to another module 14, 16. When the transfer mechanism 18 transfers a object 30 from one module 14, 16 to another module 14, 16, the transfer mechanism performs three kinds of transport actions: a "pick" from the source module 14, 16; a "place" into a destination module 14, 16; and a "rotate" in order to reach the source and destination module 14, 16.

The manufacturing process of an object 30 through an apparatus 10 generally comprises a number of visits, $V_i$, which together form a route. A process visit occurs each time an object 30 enters a processing module 16 for an operation, and a process visit can comprise one or more identical processing modules 16. In the preferred embodiment, each process module 16, in a single-visit, single-route, single-object and dual arm cluster tool, with parallel-module visits, can process only one object 30 at a time. To manufacture one semiconductor object product unit, all process visits are performed at least once.

After all of the process steps for the object 30 are performed, the object 30 is returned to the cassette 15 it originated from. When all of the objects 30 in a cassette 15 are processed, the cassette 15 will be removed and replaced with another cassette 15 containing a new set of unprocessed objects 30. It is a feature of the present invention to be able to alternately load cassettes 15 into the apparatus 10 while other objects 30 are being processed, so that objects 30 are always ready for processing at any one time.

Figure 2A:
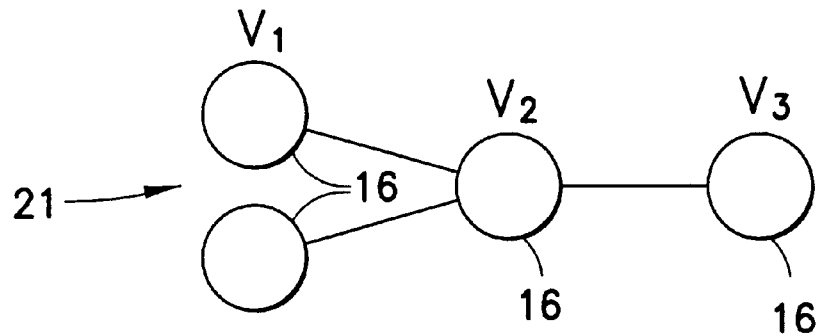
FIGS. 2A through 2C are schematic diagrams of three configurations for an object processing apparatus incorporating features of the present invention.
Figure 2B:
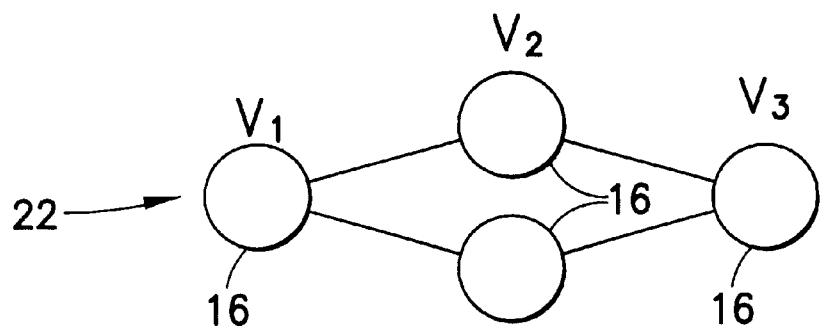
Figure 2C:
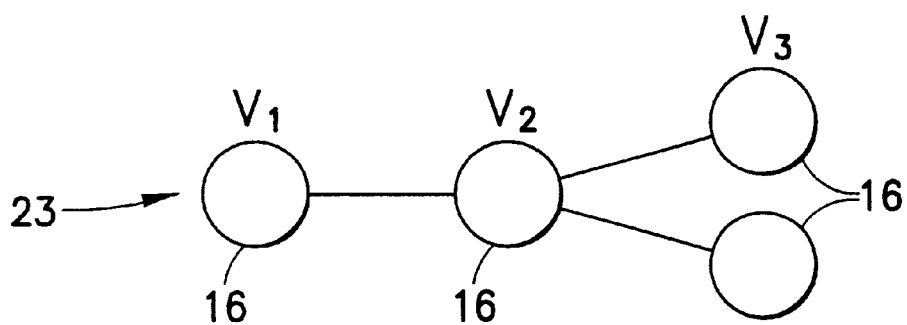

The configuration of a processing apparatus 10 generally comprises a set number of visits $V_i$. For each visit, the number of associated processing modules 16 is generally known. Having more than one processing module in a visit represents parallelism in a visit. The number of visits and the number of processing modules per visits determine the topology of the configuration and the subsequent schedule for the apparatus 10. FIGS. 2A through 2C shows three possible topologies, or configurations, 21, 22 and 23, for embodiments of a processing apparatus 10 with three visits, $V_1$, $V_2$ and $V_3$, and four processing modules 16. In the preferred embodiment, the processing apparatus 10 is a cluster tool. Due to the physical structure of a cluster tool 10, a maximum of six processing modules in a configuration is considered. However, in an alternative embodiment, the number of processing modules 16 in a processing apparatus 10, may be any suitable number, including more or less than six. In the preferred embodiment, the method of the present invention comprises determining an optimum schedule for all possible configurations of processing modules 16 in an apparatus 10.

Using a method incorporating features of the present invention, scheduling a flow of objects 30 through a processing apparatus 10 generally involves specifying a sequence of actions, pick and place, for the transport mechanism 18 and the relative times as applied to the objects 30. The preferred schedule should allow the objects 30 to move between processing modules 16 while satisfying a number of constraints and objectives, and keeping the running time (execution) of the method to a minimum.

One of the constraints and objectives is the throughput of the apparatus 10. The throughput comprises the processing rate of the processing apparatus 10, usually expressed in the number of objects 30 processed per hour. It is a feature of the present invention to provide a scheduling solution that maximizes throughput. Another timing requirement constraint and objective is the post processing residency constraint ("PPRT"). The post-processing residency constraint is a time limit imposed on the post-processing time that a semiconductor object 30 spends in a processing module. A residency number, $t_{res}$, comprises the maximum time that an object 30 can remain in a processing module 16 after it has been processed. Due to the stringent timing and throughput requirements, scheduling the allocation of the resources, or modules 14, 16, in a tool can be complex. The present invention provides a method that addresses both post processing residency constraints and throughput requirements in a processing tool 10.

Figure 3:
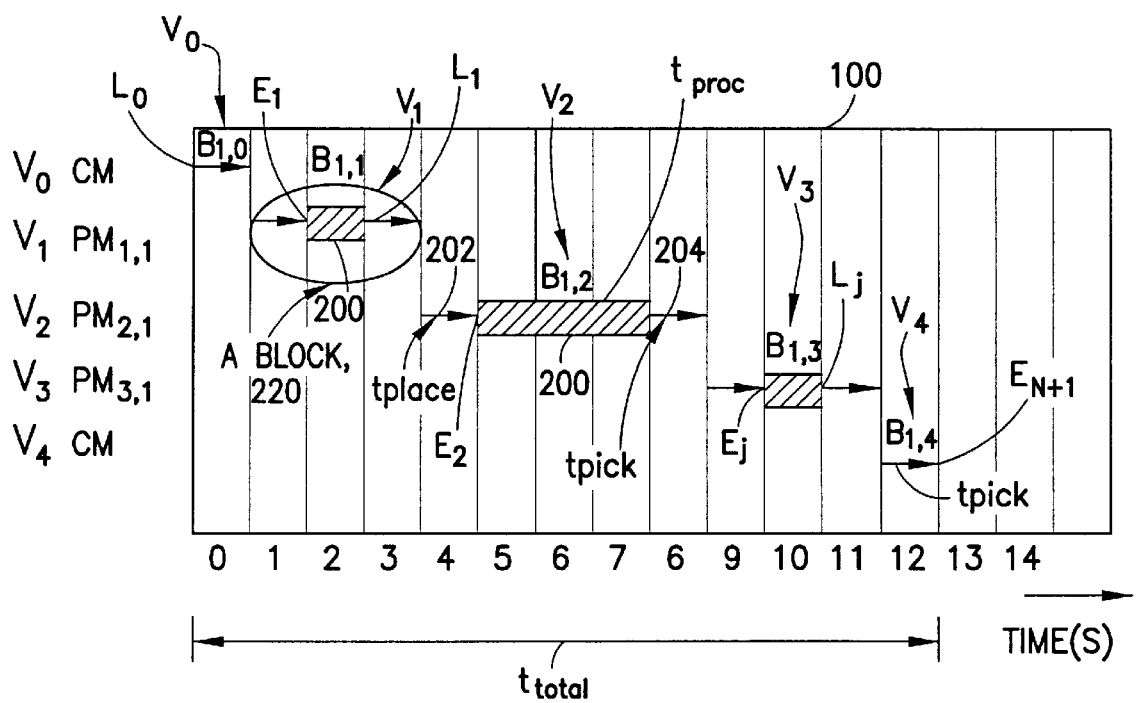
FIG. 3 is a timing diagram for processing one object through a three visit processing apparatus in accordance with one embodiment of the method of the present invention.

Referring to FIG. 3, a method of scheduling the allocation of resources 14, 16, in a material processing tool will be described. FIG. 3 shows a timing diagram, or schedule 100, for a three visit processing apparatus 10 with only one object 30 to be processed incorporating features of the method of the present invention. To represent a schedule for the manufacture of one product unit, all of the times that an object 30 enters and leaves a visit are defined. As shown in FIG. 3., $E_j$ represents the time that an object 30, enters a visit $V_j$ and $L_j$ represents the time that the object 30 leaves a visit, where j represents the number of the $j^{th}$ visit. As used herein, the term $W_i$ represents object 30 where i represents the $i^{th}$ object 30. As shown in FIG. 3, each visit is represented by the term $B_{i,j}$. Thus, for example, in FIG. 3, the block 220 for the visit $V_1$ is represented by the term $B_{1,1}$, meaning the first visit for the first object 30.

In FIG. 3, the visits $V_1$, $V_2$ and $V_3$, each correspond to an action in a processing module 16. The first processing module 16 is represented by the term $PM_{1,1}$, the second processing module 16 is represented by term $PM_{2,1}$, and an the third processing module 16 is represented by the term $PM_{3,1}$. The term CM represents the cassette 15, where $V_0$ is when Wi leaves the cassette 15 and $V_4$ is when Wi is placed back in cassette 15. The terms $L_0$ represents the time that $W_i$ leaves the cassette 15 and $E_{N+1}$ is the time that $W_i$ is placed back into the cassette 15, where N is the number of processing visits.

In FIG. 3, each of the filled boxes 200 represent a variable time interval in the schedule 100 that an object 30 remains in a processing module 16 of a visit $V_i$. For example, the box 200 in $V_1$ comprises the processing time, $t_{proc}$, for $W_i$ in visit $V_1$.

The processing time, $t_{proc}$, comprises the time that the object 30 must remain in the processing module 16 to be completely processed. If the object 30 leaves the processing module 16 before the end of time interval $t_{proc}$, the object 30 will leave prematurely. However, the object 30 cannot remain in the processing module 16 for a period greater than $t_{proc} + t_{res}$ without violating the post processing residency constraint. It is a feature of the present invention to use the processing module 16 as a buffer to temporarily hold object 30 in order to maximize throughput without violating the post processing residency constraint.

At the end of $t_{proc}$, $W_i$ is moved to the next visit $V_i$. as shown in FIG. 3. For example, for a first object 30 represented by $W_1$, $W_1$ moves from visit $V_1$ to visit $V_2$ represented by $B_{1,1}$ to $B_{1,2}$, respectively, after $W_1$ is processed in visit $V_1$. Each box 200, together with a start arrow 202 and an end arrow 204, represents a block of time 220 on the schedule. Arrows 202 and 204 represent transport actions and the time intervals for the transport actions. The start arrow 202 represents a "place" action for the time interval $t_{place}$, which is the time required to place an object into a destination module 14, 16. The end arrow 204 represents a "pick" action for the time interval $t_{pick}$, which is the time required to pick an object 30 from a source module 14, 16. Accordingly, the time block 220 can be represented by the formula:

$$t_{Block} = t_{proc} + t_{pick} + t_{place}$$

As shown in FIG. 3, each block 220 is designated by the term $B_{i,j}$, where $B_{i,j}$ represents the $j^{th}$ block 220 of the $i^{th}$ object 30. Block $B_{1,0}$ represents the pick 202 of object $W_1$ from the cassette 15, and block $B_{1,N+1}$, represented by $B_{1,4}$ in FIG. 3, represents the place 204 of $W_1$ back into the cassette 15. In FIG. 3, $L_0=0$, and denotes the time that the object $W_1$ leaves the cassette 15, and $E_{N+1}=13$ denotes the time that the object $W_1$ is placed back into the cassette 15. Since the total time, $t_{total}$, for $W_i$ to be completely processed and returned back to the cassette module is represented by the formula: $E_{N+1}-L_0$, for example shown in FIG. 3, the $t_{total}$ is 13−0=13.

In order to schedule a plurality of objects 30 for processing through the apparatus 10, one embodiment of the method of the present invention can include searching for a periodic solution for the schedule using a fundamental period ("FP"). The fundamental period of the periodic schedule 100 can comprise the time interval for introducing subsequent objects 30 into the apparatus 10. The relative times that the object 30, enters and leaves a visit in a route will be repeated for the subsequent objects 30 in the following periods.

Each periodic schedule has an initial, steady and terminate state. The initial and terminate states are transients. In the preferred embodiment, two cassettes 15 are used in the apparatus 10. Thus, it can be assumed that there is always an object 30 ready to be processed at any one time. Therefore, the initial and terminate states will be relatively small compared to the steady state. It is a feature of the present invention to search for a periodic solution that has the best throughput in the steady state with the minimum fundamental period.

Figure 4:
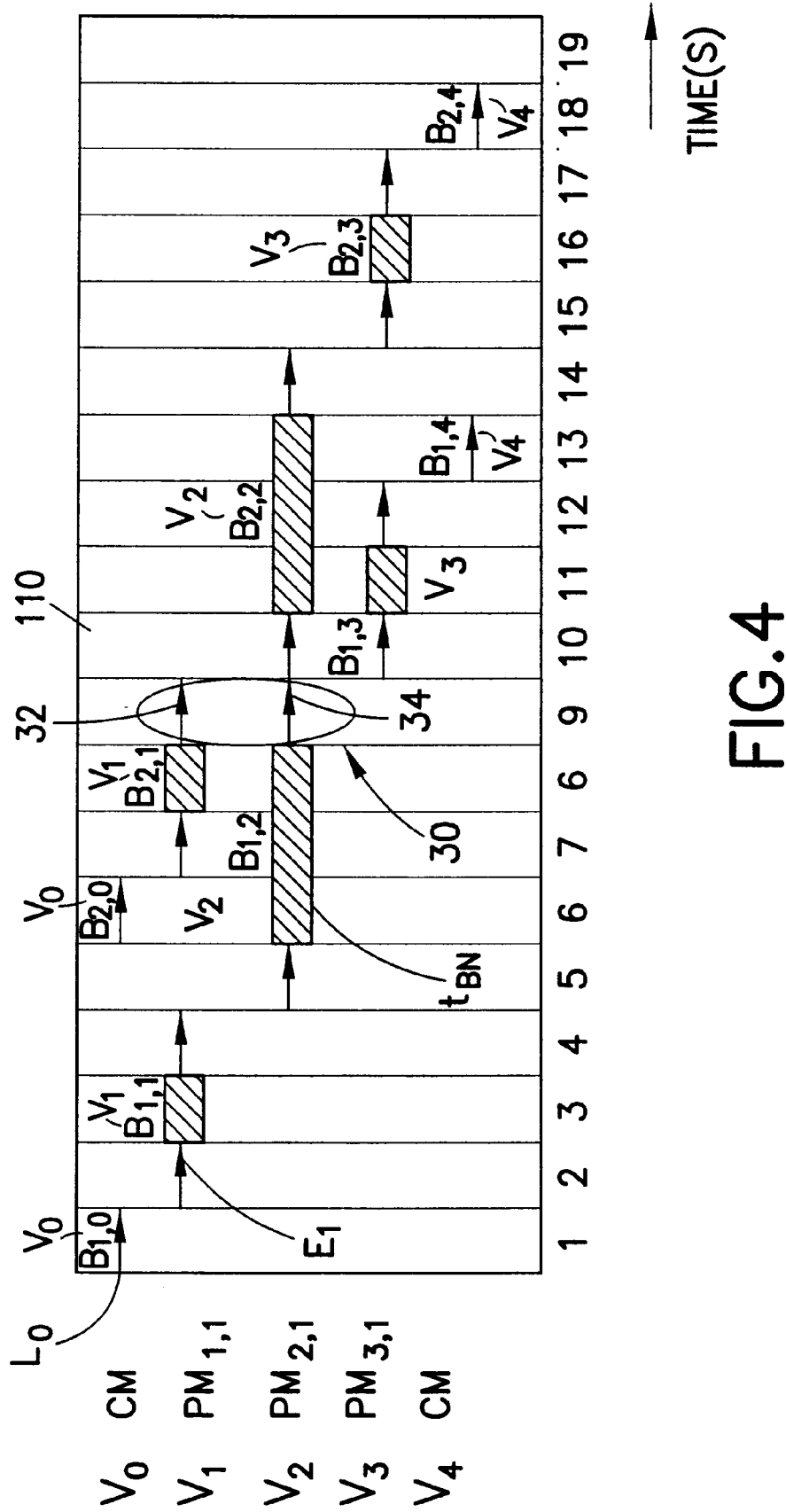
FIG. 4 is a timing diagram for processing two objects through a three visit processing apparatus in accordance with one embodiment of the method of the present invention.

A timing diagram of a simple periodic schedule 110 of a three-visit processing tool with two objects is shown in FIG. 4. In accordance with the method of the present invention, in a single-route processing tool, because all of the objects 30 go through the same route, the visit $V_i$ whose effective processing time, $t_{\mathit{eff}}$, is more than the others is used in determining the throughput of the apparatus 10. As shown in FIG. 4, for a single module visit, the effective processing time is equal to $t_{\mathit{proc}}$, whereas for a parallel module visit, the effective processing time is equal to the processing time of a single module 16 that has the same effect on the apparatus 10 throughput as all the parallel modules 16 of the visit. In FIG. 4, the visit whose $t_{\mathit{eff}}$ is more than the others is $B_{1,2}$. Thus, visit $B_{1,2}$ is called the bottleneck, and the bottleneck time, $t_{BN}$, is equal to the $t_{\mathit{eff}}$ of that visit.

For any single-module visit, the fundamental period must be greater than or equal to its $t_{BN}$. For any parallel-module visit, the fundamental period must be greater than or equal to the effective block time of the equivalent module visit. The objects 30 are assigned to parallel modules of a visit in a round robin fashion. So, as shown in FIG. 4, with three processing modules 16, in visit $V_1$ object 1 is assigned to processing module 1($PM_{1,1}$), object 2 to processing module 2($PM_{1,2}$), object 3 to processing module 3($PM_{1,3}$), object 4 to processing module 1($PM_{1,1}$) and so on. The term CM corresponds to the cassette 15. Considering the definition of $t_{BN}$, the best possible fundamental period for the periodic schedule can be represented by the sum of ($t_{BN}+t_{pick}+t_{place}$) divided by the number of modules in the visit with the largest $t_{BN}$. This is the minimum fundamental period for the schedule 110 because any smaller period will be less than the interval of the bottleneck block. It is a feature of the present invention to maintain the smallest fundamental period possible, although the total time that an object remains in the apparatus, the $t_{\mathit{total}}$, may increase.

In the periodic schedule 110 shown in FIG. 4, the objects 30 subsequent to the first object $W_1$, enter and leave visits at the same relative times as the first object 30, separated by the fundamental period time interval. Thus, the relative times of objects 30 subsequent to the first object $W_1$, can be represented by the formula (i–1)×FP. Since in FIG. 4, the bottleneck is block $B_{1,2}$, the fundamental period for the schedule is five time intervals, or slots. Accordingly, $W_2$, represented by block $B_{2,0}$ is introduced into the apparatus 10, five time intervals after the introduction of $W_1$. Thus, a simple periodic schedule 110 without any idle time of the transport mechanism 18 and processing module 16 is developed.

In developing a feasible schedule for allocating the resources 14, 16 in a processing apparatus 10 incorporating features of the present invention, the following conditions should be satisfied:

1. The time that an object 30 spends in a processing module 16 is lower bounded by $t_{\mathit{proc}}$ and upper bounded by $t_{\mathit{proc}}+t_{\mathit{res}}$.

2. At each time interval in the periodic schedule there must be at most one object 30 in each processing module 16.

3. The schedule must be conflict free. In a conflict free schedule, the transport mechanism 18 is scheduled such that no two transport actions 202, 204, are scheduled at any one time, and at most, only one object resides on each of the two holders 28 of the transport mechanism 18.

In the simple periodic schedule 110 of FIG. 4, conditions one and two are satisfied. However, conflicts 50 may occur between the time intervals during which the transport mechanism 18 is scheduled to move an object 30 from one module 14, 16, to another module 14, 16. A search of the periodic schedule 110 identifies at least one conflict 50. For simplicity purposes, only one conflict in the schedule 110 is referred to, although other conflicts may exist. The conflict 50 arises because the pick 32 from block $B_{2,1}$, and the pick 34 from block $B_{1,2}$, are both scheduled to occur in the same time interval represented by time interval 9 in FIG. 4.

Figure 5:
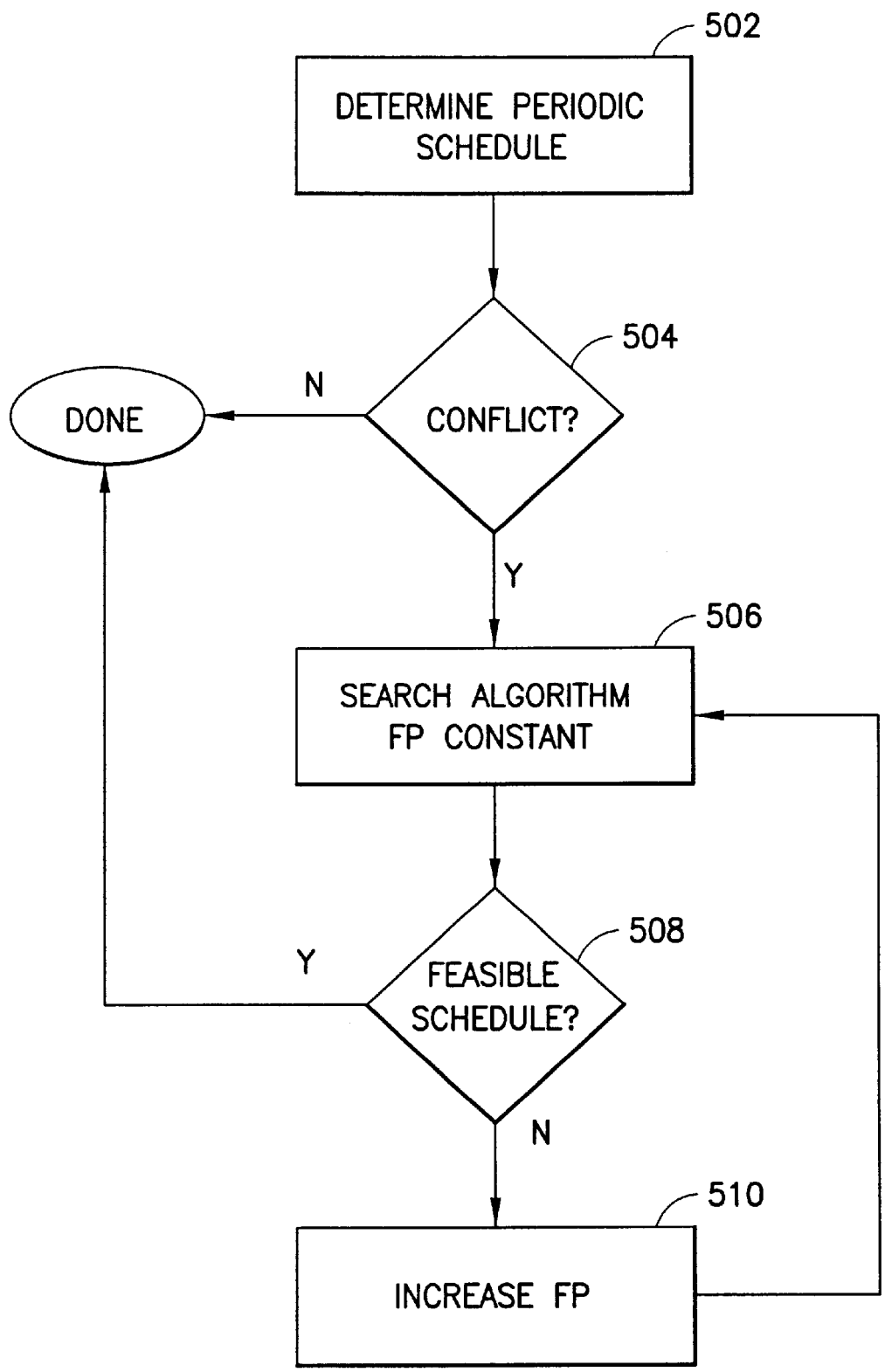
FIG. 5 is a flow chart of an embodiment of a method for finding a conflict-free object processing schedule incorporating features of the present invention.

After a conflict is identified, one embodiment of a method of searching for a solution to the conflict 50 incorporating features of the present invention is shown in FIG. 5. In this embodiment, the method comprises searching in the time and resource domains for a feasible schedule with a maximum throughput. As shown in FIG. 5, the method of the present invention operates in two main phases. First, a periodic schedule for the introduction and processing of objects 30 in the processing apparatus 10 is formed as indicated by block 502. The periodic schedule is examined for any conflicts as indicated by block 504. Once a conflict is identified, the method comprises searching for a feasible solution without altering the periodic nature of the schedule as indicated by block 506. If a feasible solution cannot be found, block 508, the method includes incrementally increasing a fundamental period for the schedule while keeping throughput at a maximum as indicated by block 510. The method can include repeating the search for a feasible solution as indicated by returning to block 506 from bloc 510. The resulting schedule should be deadlock free since resources 14, 16, are scheduled according to the times they are available.

Figure 6:
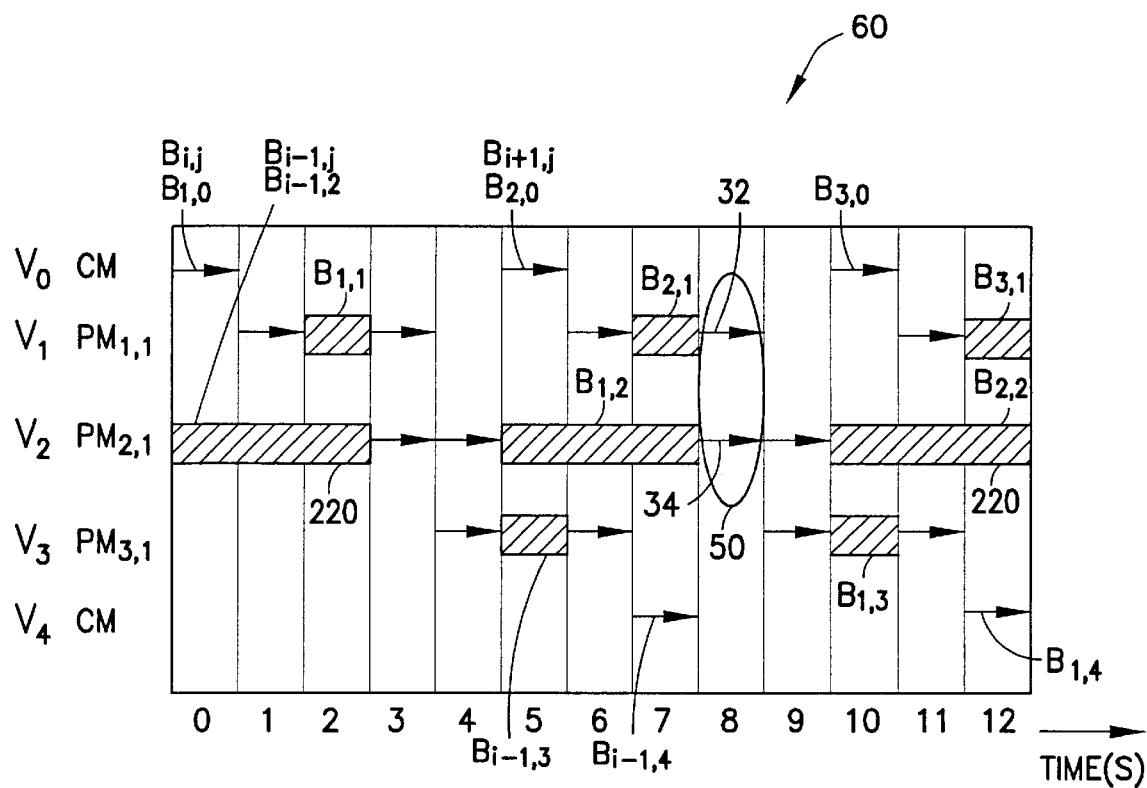
FIG. 6 is a timing diagram for a search window for finding a conflict-free object processing schedule in accordance with one embodiment of the method of the present invention.

The first search 506 generally comprises searching for a periodic solution that does not change the fundamental period, but rather increases the total time, $t_{\mathit{total}}$, that an object 30 remains in the apparatus 10. In order to carry out the search, the pattern of the periodic schedule 110 is displayed in a search window 60 with a length equal to $t_{\mathit{total}}$ as shown in FIG. 6. The pattern in the search window 60 repeats the pattern of visits of schedule 110 that take place during time interval $t_{\mathit{total}}$. The search window 60 generally includes the schedule for each visit of an object $W_i$, as well portions of the pattern for a previous object, $W_{i-1}$, as well as portions of a pattern for a subsequent object, $W_{i+1}$. Visits of the previous object 30 are represented by $B_{i-1,j}$, and visits of the subsequent object 30 are represented by $B_{i+1,j}$.

Figure 7:
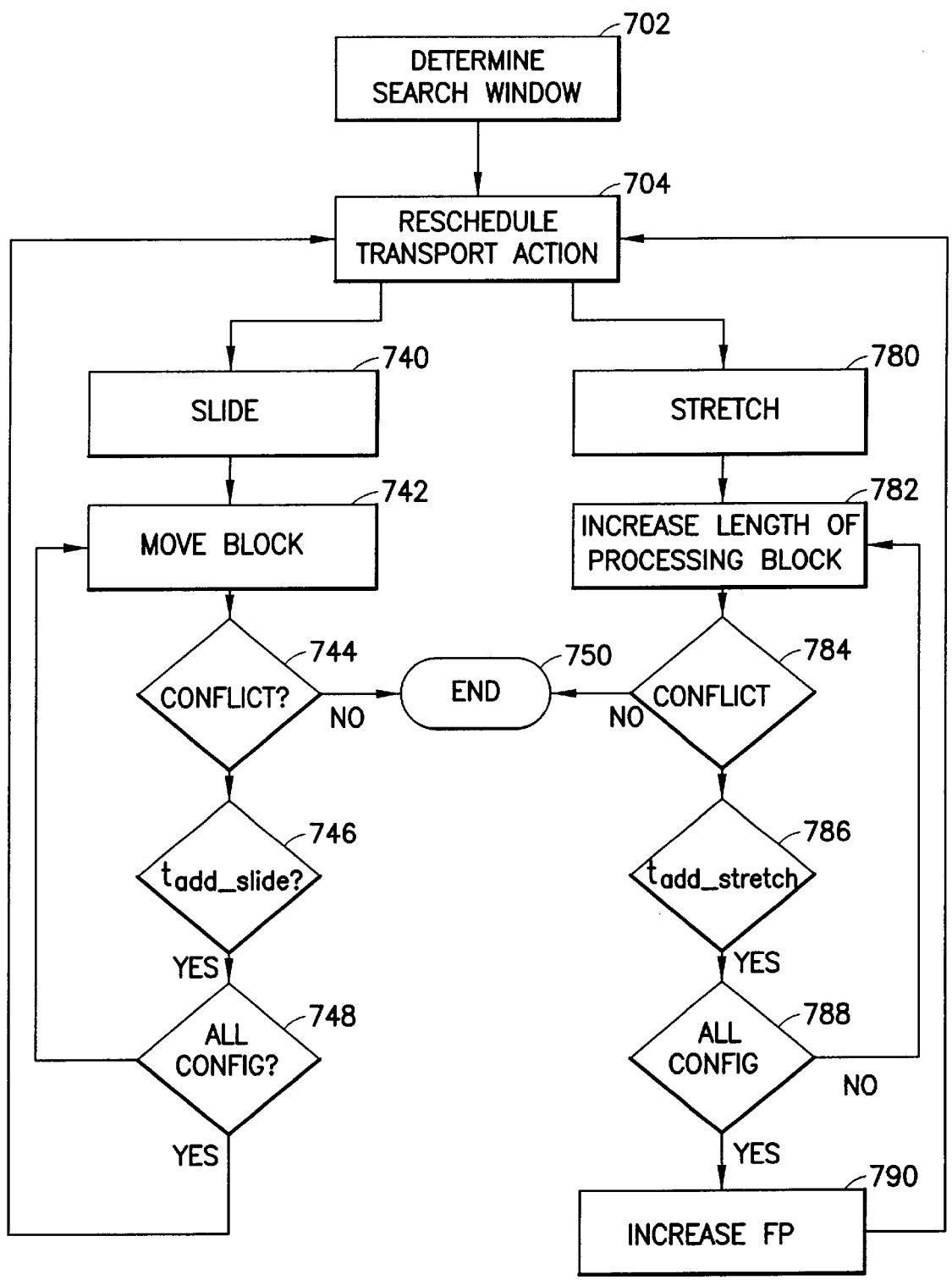
FIG. 7 is a flowchart of an embodiment of a method for finding a conflict-free object processing schedule incorporating features of the present invention.

To resolve the conflict 50 in the search window 60 in accordance with features of the present invention, the transport actions 32 and 34 associated with the conflict must be moved. Because it is the relative time relation between the blocks 220 that is important, and not their absolute time, the method of the present invention includes moving blocks 220 in the search window 60 to an earlier time interval. Thus, in accordance with one embodiment of the method, a search generally comprises forming a search window as indicated in block 702 in FIG. 7, and rescheduling a transport action associated with a conflict 50 as indicated in block 704.

Figure 8:
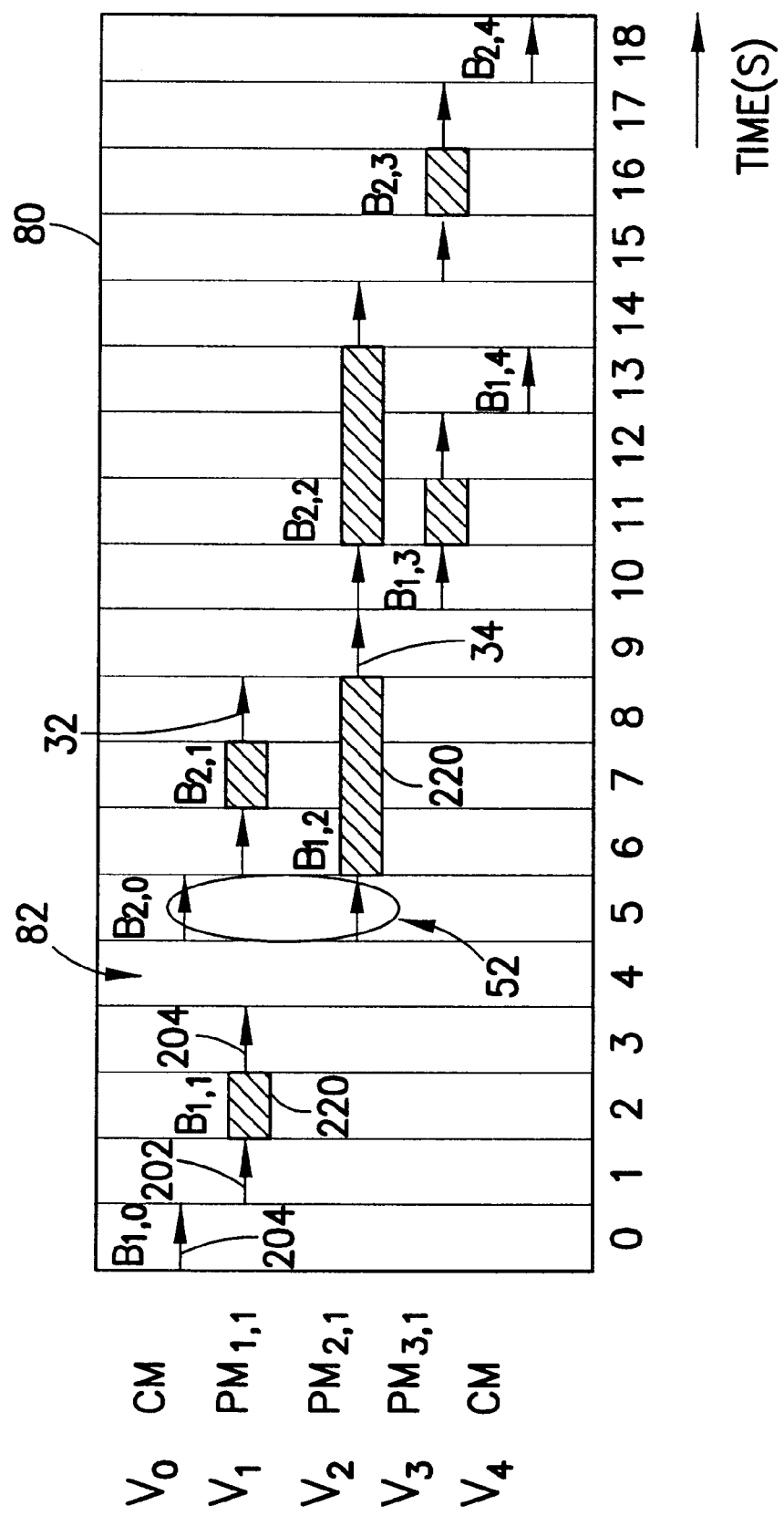
FIG. 8 is a timing diagram for a simple periodic schedule after increasing the total time for processing an object in accordance with one embodiment of the method of the present invention.

There are two ways to reschedule a transport action 202, 204 associated with the block 220. The first is a "slide" as indicated in block 740, and the second a "stretch" as indicated in block 780. In accordance with the method of the present invention, in a "slide", a whole block 220 is preferably moved some unit of time to the left, or to an earlier time as indicated in block 742. In an alternate embodiment, the block 220 may be moved any suitable time reference. By this action both the place 202 and the pick 204 associated with block 220 now happen at a different, earlier time. Thus, at least one block 220 associated with the conflict 50 is moved to an earlier time. A shown in FIG. 8, visit $B_{1,0}$ and visit $B_{1,1}$ have been moved one unit of time to the left to occur at an earlier time. To move visit $B_{1,0}$, the place action 204 is moved in this example to an earlier time unit. For visit $B_{1,1}$, the pick 202, the block 220, and the pick action, are each moved in this example to an earlier time unit. While this movement increases the $t_{total}$ of the resulting schedule 80, the fundamental period of the schedule 80 does not change from its original value. Accordingly, blocks 220 for visits represented by $B_{2,0}$ and $B_{2,1}$ will also occur one time unit earlier. By sliding both $B_{1,0}$ and $B_{1,1}$, the original conflict 50 has been resolved. However, when the resulting schedule 80 is again searched for conflicts 50 as indicated in block 744, at least one new conflict 52 is identified. In order to resolve this new conflict 52, the method includes determining if a limit or bound on sliding the block 220 associated with the conflict 52 has been reached as indicated by block 746. In one embodiment, a bound on the amount $t_{add\_slide}$ that a block 220 can be moved in a slide operation when the residency constraint is zero may be represented by the formula:

$$t_{add\_slide} \leq 2 \times FP - (t_{pick} + t_{place}) \times N$$

where N equals the number of objects 30 in the apparatus 10. In the simple periodic schedule 110 shown in FIG. 4, the object 30 does not have any idle time. It is either being processed by a processing module 16, or being transported by transport mechanism 18. Thus, the $t_{res}$ is zero. The amount of the time interval that the block 220 will be moved during a slide action will now be idle time. During this idle time 82, the object 30 must be buffered temporarily in either the transport mechanism 18 or a processing module 16. Since in a "slide" operation, the process time interval 200 for the block 220 does not increase, the object 30 must be idled, or buffered temporarily on a holder 28 of the transport mechanism 18. In the preferred embodiment, the object 30 is buffered temporarily on one of the two holders 28 of the dual arm robot 18. However, in an alternate embodiment, the object 30 may be buffered in any suitable mechanism. For each object 30, the holder 28 of the transport mechanism 18 is used for a time interval of $2 \times FP - (t_{pick} + t_{place}) \times N$ as a buffer, with the time interval $(t_{pick} + t_{place}) \times N$ being the time interval for the pick 204 and the place 202 times. Thus, each object 30 uses a holder 28 for a period equal to: $2 \times FP$ time units. If there are N objects in the apparatus 10, the total time that the apparatus 10 is operating is equal to:

System Time=Initial State+Steady State+Terminate State; and

System Time=Initial State+N×FP+Terminate State+N× FP.

Thus, the time interval that the transport mechanism 18 is used as a buffer is equal to 2×FP×N. Since, in the preferred embodiment, the transport mechanism 18 has two holders 28 and is busy all the time, the limit on sliding the block 220 to find a conflict free schedule is $t_{add\_slide}$.

If the bound on moving block 220 has not been reached, the process of sliding is repeated as indicated in block 742. If the bound on moving block 220 has been reached, the method includes determining if all possible configurations of sliding blocks 220 involved in a conflict 50, 52 have been examined as indicated by block 748. If not, the process of sliding is repeated as indicated by block 742. If a conflict free schedule is determined, the process is complete as indicated by block 750.

In one embodiment, the method of rescheduling a transport action 202, 204 involved in a conflict 50, 52, can include the step of "stretching" blocks 220 to determine a feasible schedule as indicated in block 780. In accordance with the features of the present invention, stretching a block 220 is a way to reschedule a transport action 202, 204, for a block 220. By stretching a block 220, the size of the block 220, and the processing time interval 200, become longer in time. The place action 202 associated with the block 220 that has been stretched occurs sooner in time than before, while the pick action 204 associated with the stretched block 220 does not move. Thus, the object 30 is forced to remain in the processing module 16 for a period greater than $t_{proc}$. The processing module 16 is now acting as a temporary buffer for the object 30. Considering that the object 30 cannot remain in the processing module 16 for a period greater than $t_{proc} + t_{res}$, the most that a block 220 can stretch is $t_{res}$. It is a feature of the present invention to find a feasible solution for a resource allocation schedule for a processing apparatus 10 without violating the post processing residency constraint. In one embodiment, a limit on the amount that a time interval associated with a block 220 can be lengthened may be represented by the formula:

$$t_{add\_stretch} \leq$$
$$2 \times FP - (t_{pick} + t_{place}) \times N + \sum_i \text{Min}(t_{res}(FP - (t_{proc} + t_{pick} + t_{place})))$$

for i=1 to N. During the stretch operation, the length of the processing block 200 is increased as indicated in block 782. Thus, $t_{res}$ is no longer equal to zero and the processing module 16 is being used a temporary buffer. The summation term in the formula is over all of the processing modules 16 and is the time interval that the processing module 16 is used as a buffer.

By sliding or stretching a block 220, the time $t_{total}$ increases. This increase in time is equal to the time that a transport mechanism 18 or a processing module 16 is used as a buffer to hold the object 30 temporarily. By sliding the first block associated with the visit represented by $B_{1,0}$ in the search window as shown in FIG. 6, the remaining configuration for the schedule can be determined.

Figure 9:
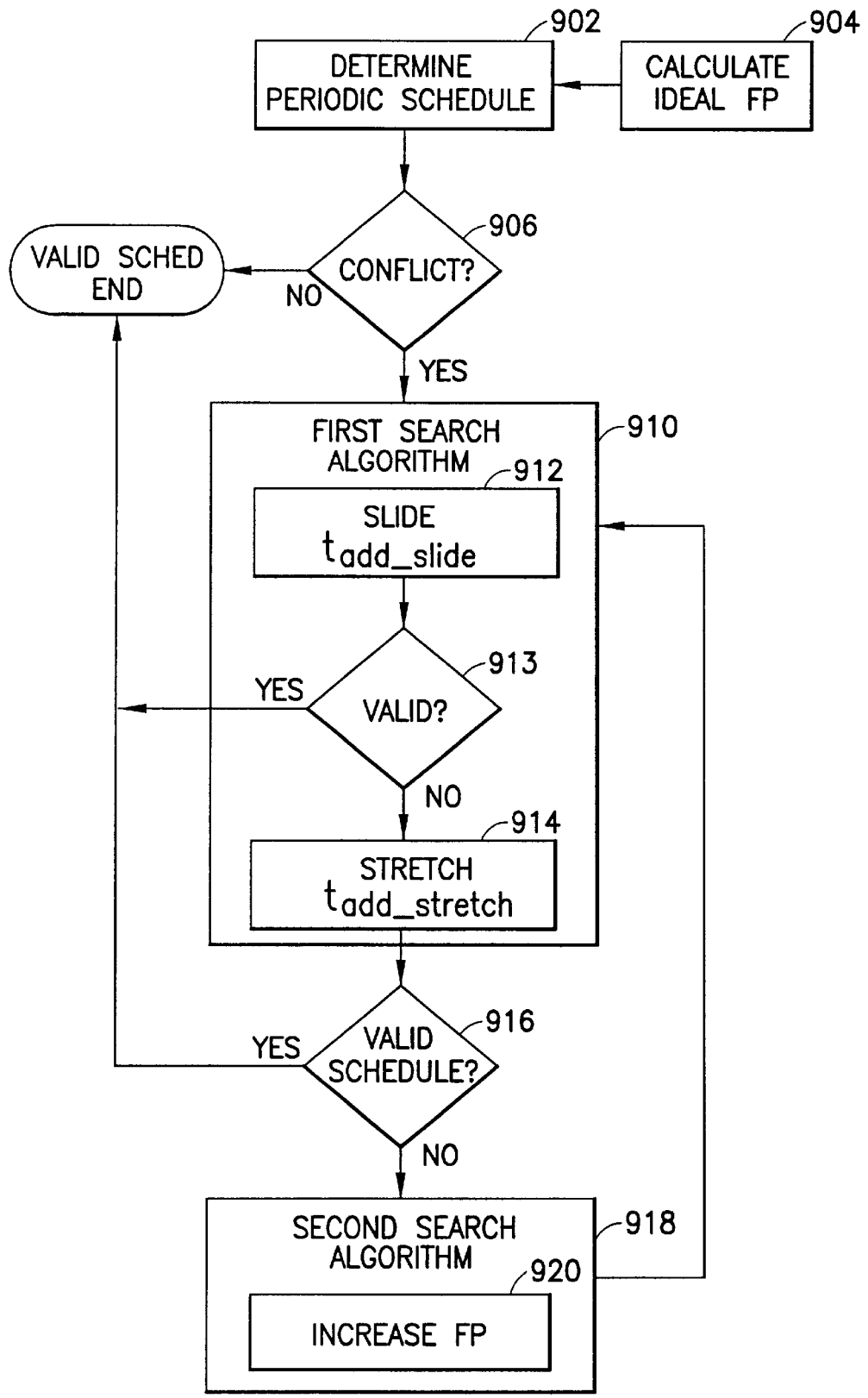
FIG. 9 is a flowchart of an embodiment of a method for finding a conflict-free object schedule incorporating features of the present invention.

In one embodiment of the method of the present invention, a periodic schedule 110 that releases object 30 into the apparatus 10 is determined as indicated by block 902 in FIG. 9. The ideal fundamental period for the periodic schedule 110 is calculated by adding the largest processing time ($t_{BN}$) among all of the process times 200 to the time of picking, $t_{pick}$, an object 30 from a process module 16, and the time of placing, $t_{place}$, an object 30 into a module 16. The sum is then divided by the number of modules 16 in the visit with the largest processing time to obtain the ideal fundamental period as indicated by block 904.

The periodic schedule 110 moves each object 30 from a visit $V_i$ in its route to the visit $V_i+1$ in the route immediately after processing in $V_i$ is complete. In the absence of any conflict, this process incurs no post processing residency time, $t_{res}=0$, thus satisfying the time constraints as well as minimizing idle time. However, the periodic schedule 110 must be examined for conflicts 50, 52 as indicated in block 906. If there are no conflicts 50, 52 among the scheduled moves of transport mechanism 18, the schedule is valid and can be applied as indicated in block 908. If a conflict 50 is found, a first search algorithm is applied as indicated in block 910. The first search algorithm generally comprises searching the time, space and resource domains to find an instance of one or more resource types (transport mechanism 18 or process module 16) that can act as a buffer to hold the object 30 whose scheduled move caused a conflict 50, 52, while the transport mechanism 18 performs transport actions on other objects 30. The search in the time domain, comprising the slide routine 740 and stretch routine 780, results in the times at which moves must be scheduled or rescheduled to resolve conflicts 50, 52 as indicated by block 912. In FIG. 9, blocks 912 and 914 correspond to slide and stretch routine block 740 and 780 in FIG. 7. Due to the periodic nature of the schedule 110, the time domain is bounded and makes the search algorithm finite and manageable. If a conflict free schedule can be found at the end of this first algorithm phase as indicated in block 916, the resulting schedule is valid and can be applied. If the first algorithm phase fails to find a conflict free schedule, the scheduler can enter a second search algorithm phase as indicated by block 918. In the second search algorithm, the ideal fundamental period of the periodic schedule 110 is preferably increased by one time unit as indicated by block 920. The slide and stretch search routines, 912 and 914 of the first algorithm are then repeated by returning to block 910 from block 918. If a conflict free schedule is not found with the new fundamental period, the algorithm again proceeds into the second search algorithm as indicated in block 918. The fundamental period is again preferably increased by one time unit as indicated by block 920, and the slide and stretch routines, 912, 914, are repeated by returning to block 910 from block 918. This process can continue until the smallest fundamental period for which a conflict free schedule can be obtained is found.

To search for a conflict-free schedule with the minimum FP, all possible configurations in the search window must be examined. In one embodiment of the method incorporating features of the present invention, by applying the slide routine 910 and the stretch routine 918 shown in FIG. 9 in a specific order, any possible state, or configuration of blocks can be reached. For example, if there is a conflict in the initial, current state, periodic schedule from step 902, slide the visit represented by $B_{1,0} \leftarrow t_{add\_slide}$ units to reach a target configuration. If the target configuration has a conflict 50, stretch the visit represented by $B_{1,i}$ $t_{add\_stretch}$ units for i=1 to N. If a conflict 50, 52 exists in the resulting configuration, the FP of the initial, current state period schedule is increased by one time unit. The slide routine 910 and the stretch routine 918 as described above are then repeated for the new schedule with the increased FP. This process can be repeated, with the FP being increased by additional time units, until a conflict-free configuration is reached.

Figure 10:
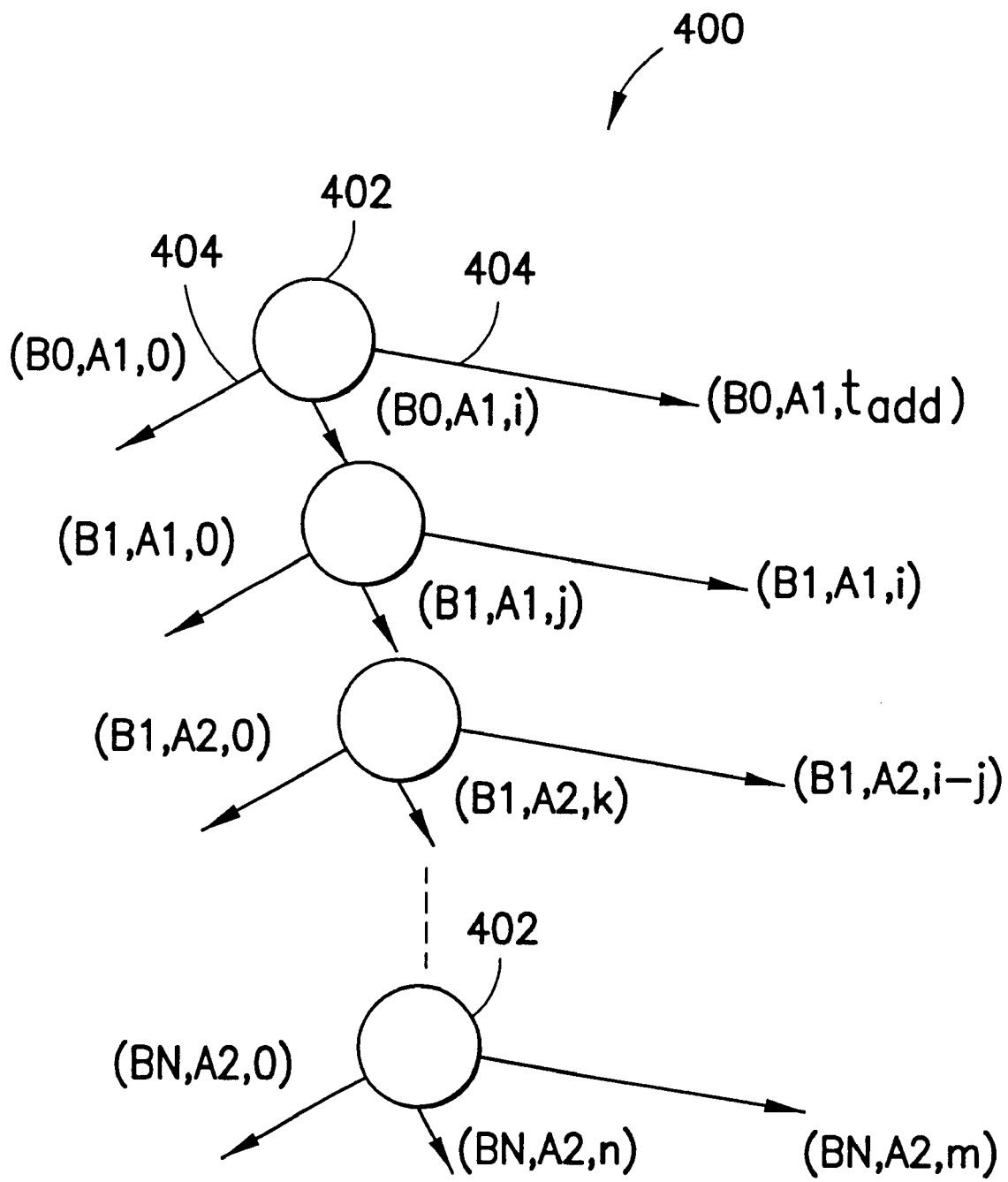
FIG. 10 is a schematic diagram of a search tree for finding a conflict-free object processing schedule incorporating features of the present invention.

The search tree shown in FIG. 10, depicts a series of actions to be applied to the simple periodic schedule to reach the conflict-free target configuration in one embodiment of the method of the present invention. The search tree 400 is comprised of nodes 402 that represent the state of the apparatus 10. Each node 402 comprises a start and end time of a block 220 of the first object. The edges 404 of each node 402 represent a state transition. By applying a state transition to the current state of the schedule, we reach a new state in the tree. There are three elements in a state transition node 402. B# is the block number of the block that has to be changed to reach the new state. A# is the action number, where for example, A1 means slide and A2 means stretch. The last number in the state transition sequence shows the number of time units that the action should be applied. For example, for the state transition sequence B2, A1, 5, the method includes sliding the second block 220 five (5) time units. Each node 402 of the tree 400 represents a configuration of blocks 220 that must be examined to determine if any are conflict free.

Because in the worst case situation, every node 402 of the tree 400 needs to be checked to find a conflict-free solution, the complexity of the algorithm of the present invention is at the same degree as the number of nodes 402. The tree 400 has $t^N_{add}$ nodes 402. The number of nodes is exponential in the number of visits. Using heuristics, the complexity of the algorithm of the present invention can be reduced.

For example, in one embodiment, the two actions of block 220 for the visit represented by $B_{1,j}$ are examined.

The first action being a slide and the second a stretch.

If after both actions, block 220 for the visit represented by $B_{1,j}$ still conflicts with block 220 for the visit represented by $B_{k,j}$, the block $B_{k,j}$ must move. If both of the blocks for the visit represented by $B_{1,j}$ and $B_{k,j}$ have had each of their actions examined, slide and stretch actions, and still conflict, the conflict will not be resolved by moving other blocks 220 in the search window 60. Thus, the internal node of the tree representing this situation shown in FIG. 10 does not lead to a conflict free node. Therefore the node is pruned from the tree and not examined further.

When the apparatus is in a transport bound region, the transport mechanism 18 is always busy moving object 30 and there is no idle time. In this situation, the period of the apparatus and resulting schedule is a function of the transport time $t_{pick}$, $t_{place}$ and N in the apparatus. A change in $t_{BN}$ while the apparatus 10 remains in the transport bound region does not affect the period. While generally, the best possible fundamental period is equal to $t_{BN}+t_{pick}+t_{place}$, if the apparatus 10 is in the transport bound region the best possible fundamental period is: $(t_{pick}+t_{place}) \times (N+1)$. Thus, in the preferred embodiment, the method of the present invention includes the step of calculating a fundamental period using each these two formulas and starting a search using the greater of the two.

In another embodiment of reducing the complexity of the method of the present invention, if the schedule includes two parallel modules 16 whose blocks 220 have a time interval greater than the fundamental period, the blocks 220 for each module 16 may conflict. To resolve this conflict, the method includes stretching the block 220 associated with one of the modules 16. If the blocks 220 of a parallel module visit conflict with each other and cannot stretch, there is no feasible solution in that path of the tree shown in FIG. 10, and the action is pruned from that node of the tree 402.

An example of one embodiment of a method incorporating features of the present invention as applied to a system 10 is shown in FIGS. 11, and 11A–11D. In this example, system 10 comprises three processing modules 16, and a cassette module 14, in addition to a transport mechanism 18 (not shown) and the other typical components of an object processing system 10.

Figure 11:
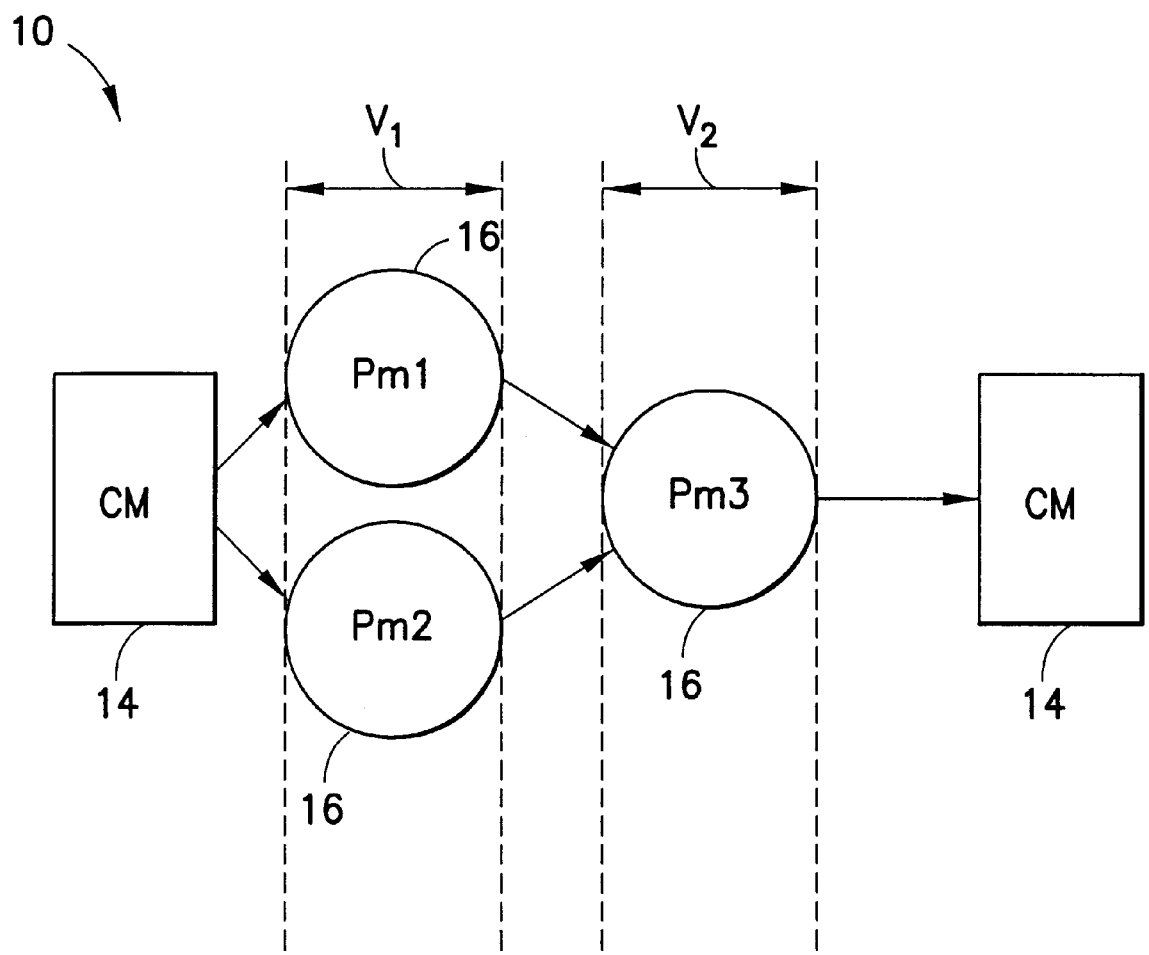
FIG. 11 is a schematic diagram of one embodiment of an object processing apparatus configuration having three processing modules and two visits.

As shown in FIG. 11, the number of processing visits, N, is two. Processing modules 16 for one visit, $V_1$, are represented by PM1 and PM2, and are parallel modules. The processing module 16 for the second visit, $V_2$, is represented by PM3. As used in this example and herein, the term CM is generally used to identify the pick and place to the cassette 15, and may be represented by the terms $V_0$ and $V_4$, respectively. Processing modules PM1, PM2 and PM2 each have a residency constraint which is defined as $t_{res}$=0. The processing time, $t_{proc}$, for the processing modules is defined as PM1=10, PM2=10 and PM3=5. The pick time, $t_{pick}$, and place time, $t_{place}$, for this example, are defined as one unit of time (T). The bottleneck processing module is PM3 and thus, the process limited FP, represented by the formula $t_{BN}+2T$, is 5+2=7. The transport limit, represented by the formula 2T(N+1), is 2×(2+1)=6.

A solution for the schedule of this configuration may be determined by applying the method of the present invention as follows:

STEP 1

Figure 11A:
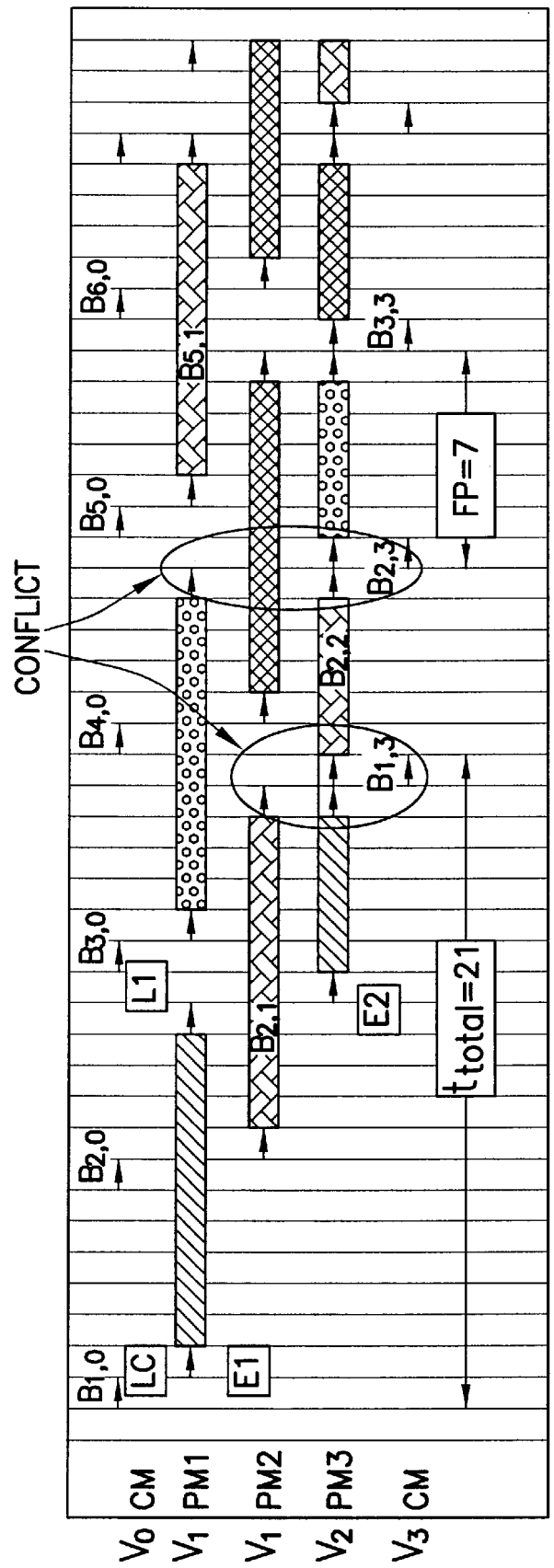
FIGS. 11A through 11D are timing diagrams of periodic schedules resulting from applying one embodiment of the method of the present invention to the object processing apparatus configuration of FIG. 11.

A simple schedule is created and made periodic by repeating the schedule for each object, shifted over the FP. FIG. 11A shows a periodic schedule for objects B1, B2, B3, B4, B5 and B6. Since visit $V_1$ involves two parallel modules PM1 and PM2, visits are alternated between PM1 and PM2 every FP time units.

STEP 2

The schedule of FIG. 11A is searched for conflicts 50. Since two conflicts 50 are identified, a new periodic solution is searched for.

STEP 3

Figure 11B:
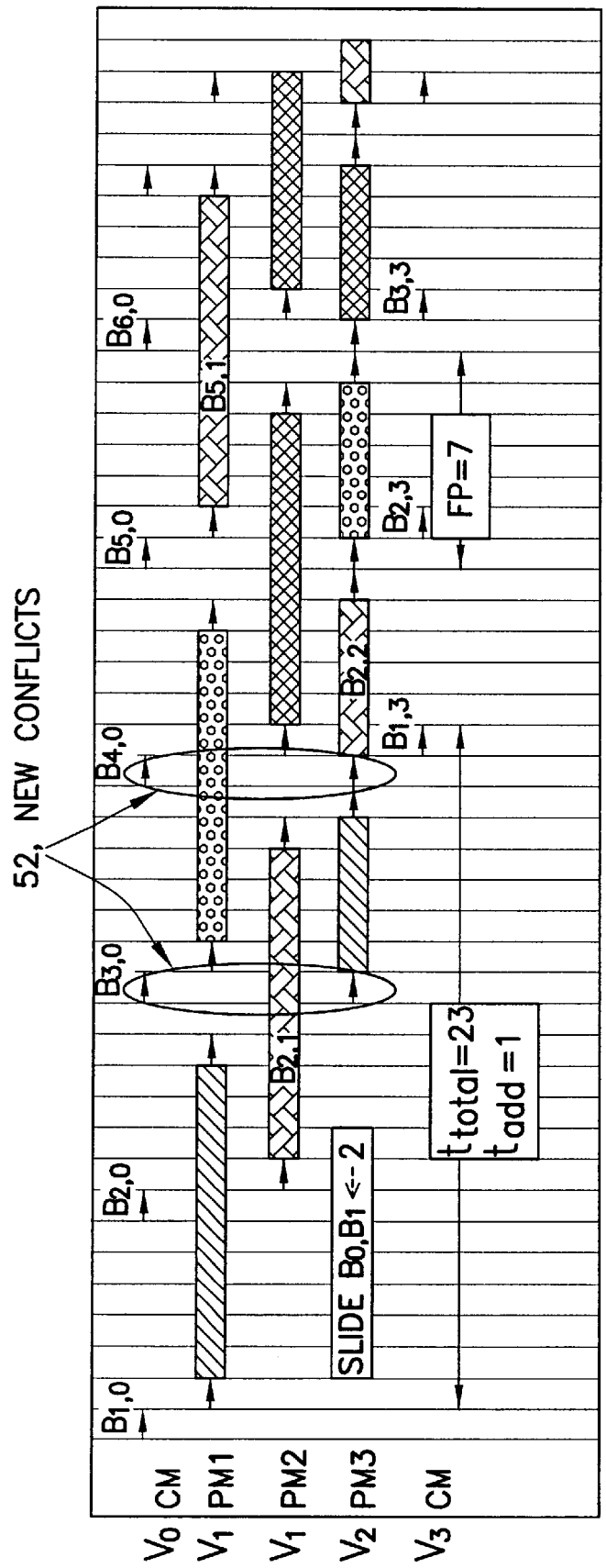
Figure 11C:
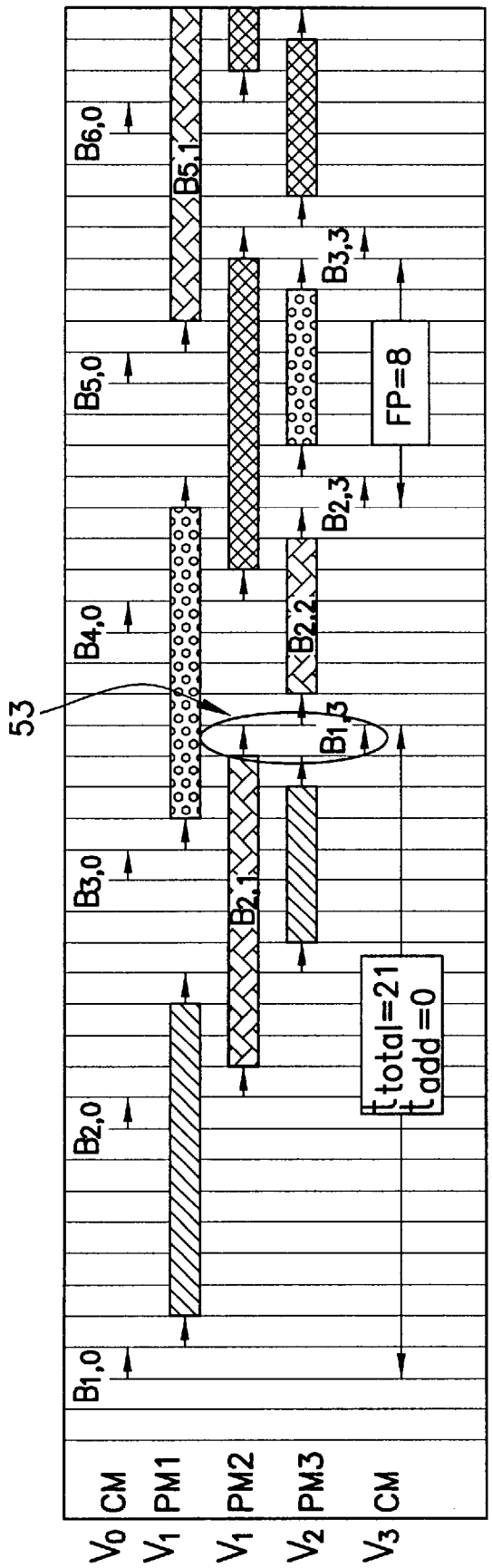

In this example, $t_{add\_slide}=2\times7-(1+1)=10$. Thus, for $0<t_{add}\leq10$, slide and stretch routines are applied in a search for a conflict free configuration. FIG. 11B demonstrates the resulting configuration for $t_{add}=2$, nodes (B0,A1,2)→(B1, A1,2). Since the constraint $t_{res}=0$, no stretching is possible in this configuration.

STEP 4

The resulting configuration, after sliding nodes for the visits represented by Bi,0, Bi,1←2, is searched for conflicts. As shown in FIG. 11B, the new schedule results in new conflicts 52.

STEP 5

Figure 11D:
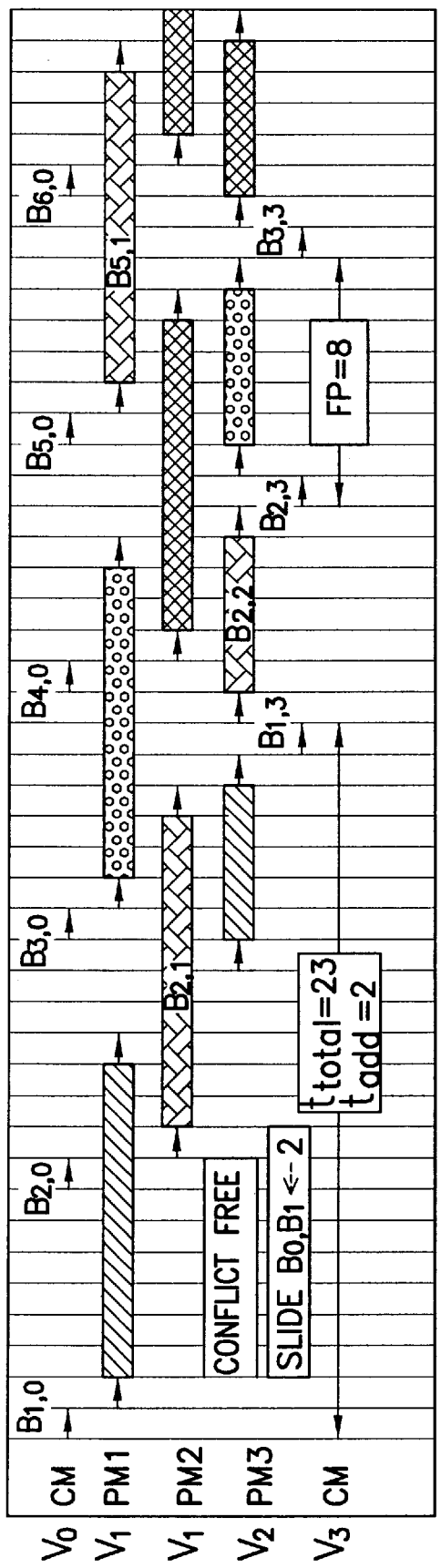

The fundamental period of the initial periodic schedule shown in FIG. 11A is increased by one time unit. As shown in FIG. 1C, after increasing the fundamental period of the initial schedule, conflict 53 results. Steps 1 through 4 of the method are then repeated. FIG. 11D shows the resulting configuration for $t_{add}=2$, (B0,A1,2)→(B1,A1,2). The resulting configuration in FIG. 11D is conflict free, and the search is complete.

Figure 12:
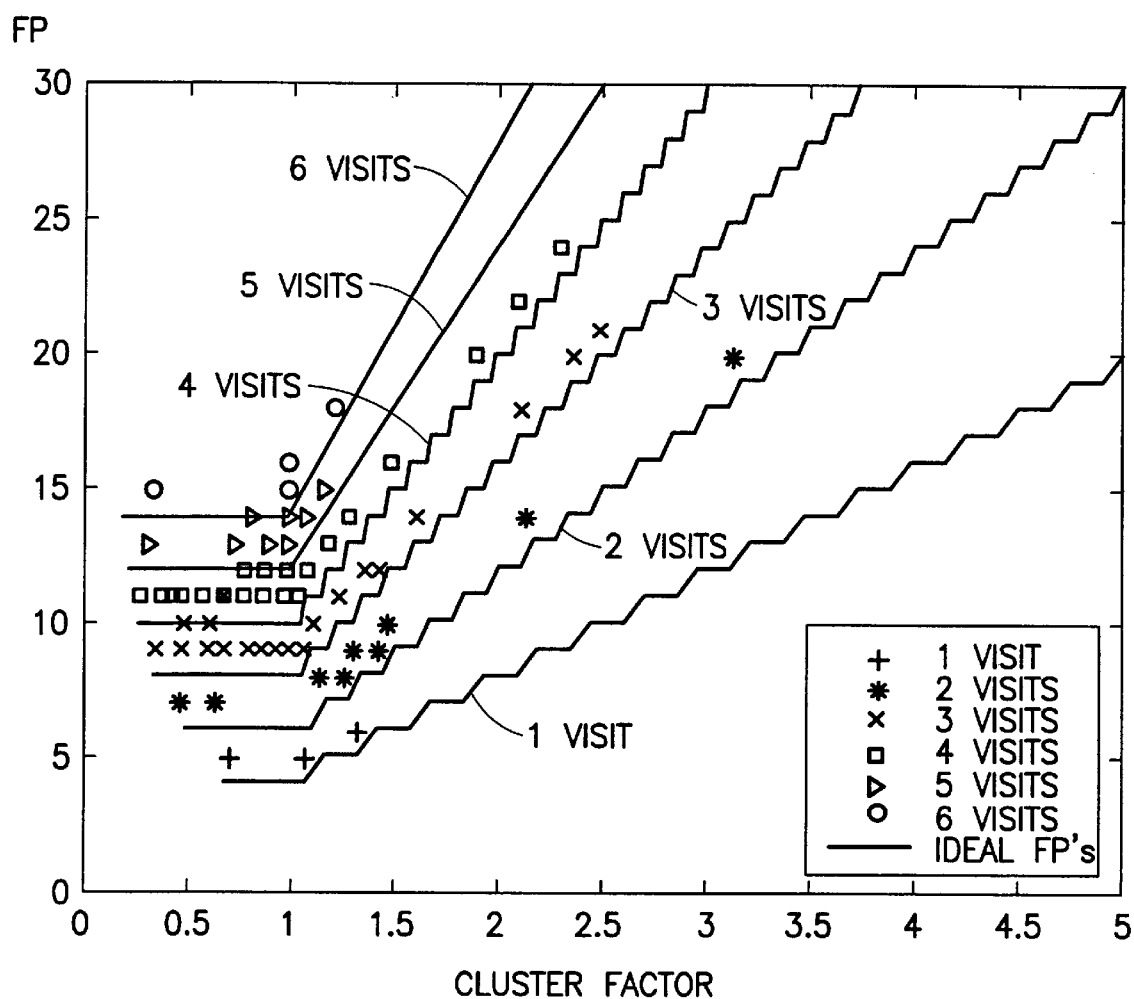
FIG. 12 is a graphical representation of the performance of a cluster tool incorporating features of the present invention in terms of fundamental period and with respect to a cluster factor.

In experimentation using the method of the present invention, a large number of problem instances were efficiently, feasibly and optimally scheduled in the first phase. FIG. 12 shows the results of experimentation in terms of fundamental period over a range of cluster factors. To evaluate system performance, a term is defined as the cluster factor. The cluster factor, calculated as $(t_{BN}+2)/(2N+2)$, provides a notion of processing over transport. If the cluster factor is less than one, the apparatus 10 is in a transport bound region. Otherwise, the apparatus 10 is in the process-bound region. One of the metrics of measuring cluster tool performance is the fundamental period. The other factor is the time, in seconds, that it takes the algorithm to find a solution. To assign $t_{proc}$ and $t_{res}$ to each visit, $t_{proc}$ was assumed to be $M_i\times k$, where k is a random number generated according to a normal distribution $N(\mu,\tau)$. In this distribution, $\mu$ is a number between 1 and 30, and $\tau$ is equal to $\mu$. After assigning $t_{proc}$, $t_{BN}$ is determined. For each $V_i$, a value to $t_{res}$ is assigned that is a uniform random number between 0 and $(t_{BN}-t_{proc})\times M_i$. In the experiments, it was assumed that $t_{pick}=t_{place}=1$. With these arrangements, 23,099 cases were generated and run on a SUN SPARC STATION (ULTRA 10). In 99.6% of the cases, the optimal solution was found in less than one second, with the worst case being about 13 seconds. As shown in FIG. 12, the solid lines show the Ideal FP drawn according to analytical models. The other points refer to the cases where the Ideal FP must be increased, due to the residency constraints, in order to find a feasible solution. In the cases with Ideal FP, when the apparatus 10 goes into a transport bound region, cluster factor less than one, FP remains constant no matter what the $t_{BN}$ is. Most of the cases require the Ideal FP to be increased for a feasible solution in the transport bound region. As shown, the Ideal FP is increased by at most two time units in transport bound cases, and by at most one unit in process bound cases. For cluster factors greater than seven, a feasible solution with Ideal FP is found in all cases.

The method of the present invention specifies and evaluates a scheduling technique for object processing tools that addresses post-processing residency constraints and throughput requirements. The technique generally searches in the time and resource domains for a feasible schedule with a maximum throughput. The method operates in two main phases, the first of which is of lower complexity than the other. The complexity of the algorithm incorporating features of the present invention can be increased progressively, and only if necessary. Several heuristics can be used to reduce the complexity of the scheduling algorithm further. The results of the experiments show that the scheduling technique of the present invention finds feasible schedules with a maximum throughput and solves an overwhelming majority, 99.6%, of the problem instances in under one second.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. A method for scheduling an allocation of resources in a semiconductor processing tool comprising the steps of:

identifying at least one conflict in a resource allocation schedule for processing a plurality of semiconductor objects through the tool over time, wherein a fundamental period is utilized for scheduling a periodic introduction of the objects into the tool for processing, the conflict occurring when a transport mechanism adapted to move the objects to and from the resources in the tool is scheduled to execute more than one transport action in a given time interval; and rescheduling at least one time block in the schedule from a present time interval to a different time interval, wherein the rescheduling of the time block does not violate a post-processing residency constraint for a residency time that the object spends in the resource whose time block is rescheduled.

2. The method of claim 1 wherein the step of rescheduling at least one time block in the schedule from a present time interval to a different time interval comprises rescheduling the time block to an earlier time interval.

3. The method of claim 1 wherein the step of rescheduling one or more of the time blocks comprises not changing the fundamental period of the schedule.

4. The method of claim 1 wherein the step of rescheduling one or more of the time blocks comprises the step of increasing a total time for producing at least one object in the tool by a predetermined time period.

5. The method of claim 4 wherein the step of increasing the total time for producing at least one object comprises the step of sliding at least one selected time block by the predetermined amount to an earlier time interval.

6. The method of claim 5 wherein a maximum amount to slide the time block is represented by the equation:

$$t_{add\_slide}\leq 2\times FP-(t_{pick}+t_{place})\times N$$

wherein FP is the fundamental period of the schedule, $t_{pick}$ is the pick time, $t_{place}$ is the place time, and N is a number of objects.

7. The method of claim 5 wherein the step of sliding at least one selected time block to the earlier time interval comprises the steps of:

shifting a pick time block associated with the selected time block by the predetermined amount to the earlier time interval;

shifting a processing time associated with the selected time block by the predetermined amount; and shifting a place time associated with the selected time block by the predetermined amount.

8. The method of claim 5 further comprising the steps of:

identifying a new conflict in the schedule after sliding the selected time block;

increasing the fundamental period of the schedule;

identifying another conflict; and repeating the step of sliding at least one selected time block by the predetermined amount to an earlier time interval.

9. The method of claim 1 wherein the step of rescheduling the one or more time blocks comprises the step of increasing the residency time for at least one object in at least one resource in the schedule.

10. The method of claim 9 wherein the step of increasing the residency time for at least one object in at least one resource in the schedule comprises the step of stretching a processing time block a predetermined time period to an earlier time interval.

11. The method of claim 10 wherein a maximum amount to stretch the time block is represented by the equation:

$$t_{\text{add\_stretch}} \leq 2 \times FP - (t_{pick} + t_{place}) \times N + \sum_i \text{Min}(t_{res}(FP - (t_{proc} + t_{pick} + t_{place})))$$

for i=1 to N, wherein FP is the fundamental period of the schedule, $t_{pick}$ is the pick time, $t_{place}$ is the place time, $t_{res}$ is a residency constraint, $t_{proc}$ is a processing time, and N is a number of objects in the tool.

12. The method of claim 10 wherein the step of stretching the processing time block a predetermined time period comprises the steps of:

moving a place time block associated with a selected time block by the predetermined time period to the earlier time interval; and increasing the size of the processing time block associated with the selected time block by moving one end of the processing time block the predetermined time period.

13. The method of claim 10 further comprising the steps of:

identifying a new conflict in the schedule after stretching the selected time block;

increasing the fundamental period of the schedule;

identifying another conflict; and repeating the step of stretching at least one selected time block by the predetermined amount to an earlier time interval.

14. The method of claim 1 wherein the step of rescheduling one or more time block comprises the step of increasing the fundamental period of the resource allocation schedule by at least one time interval.

15. The method of claim 14 further comprising the steps of:

identifying another conflict in the schedule after increasing the fundamental period; and sliding at least one time block by the predetermined amount to an earlier time interval.

16. The method of claim 14 further comprising the step of:

identifying another conflict in the schedule after increasing the fundamental period; and stretching at least one time block by the predetermined amount to an earlier time interval.

17. The method of claim 1 wherein the residency time that an object spends in a resource is bounded at a lower end by a processing time for the object and at an upper end by the sum of the processing time for the object and a residency constraint for the object.

* * * * *